US012519883B2

(12) United States Patent
Lim et al.

(10) Patent No.: US 12,519,883 B2
(45) Date of Patent: Jan. 6, 2026

(54) DEVICE, SYSTEM AND METHOD FOR ROUTING BOTNET CALLS TO A BOTNET CALL-ANSWER QUEUE

(71) Applicant: MOTOROLA SOLUTIONS, INC., Chicago, IL (US)

(72) Inventors: Bing Qin Lim, Bayan Lepas (MY); Ming Yeh Koh, Bayan Lepas (MY); Wei Ling Cecilia Liaw, Butterworth (MY); Christo Yohannan, Bengaluru (IN); Andrzej Bukowski, Tarnobrzeg (PL); Christopher S. Gordon, Glasgow (GB); Moh Lim Sim, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 448 days.

(21) Appl. No.: 18/015,991

(22) PCT Filed: Sep. 1, 2020

(86) PCT No.: PCT/PL2020/050060
§ 371 (c)(1),
(2) Date: Jan. 13, 2023

(87) PCT Pub. No.: WO2022/050854
PCT Pub. Date: Mar. 10, 2022

(65) Prior Publication Data
US 2023/0275995 A1 Aug. 31, 2023

(51) Int. Cl.
*H04M 3/436* (2006.01)

(52) U.S. Cl.
CPC ................. *H04M 3/4365* (2013.01)

(58) Field of Classification Search
CPC .................................................. H04M 3/4365
See application file for complete search history.

(56) References Cited

U.S. PATENT DOCUMENTS

| 10,637,994 B2 | 4/2020 | Amin et al. |
| 2006/0039540 A1 | 2/2006 | Issinski |

(Continued)

FOREIGN PATENT DOCUMENTS

GB 2455505 A 6/2009

OTHER PUBLICATIONS

"International Search Report", mailed Dec. 21, 2020, issued in corresponding PCT application PCT/PL2020/050060, filed Sep. 1, 2020.

(Continued)

*Primary Examiner* — Myron Wyche
(74) *Attorney, Agent, or Firm* — PERRY + CURRIER INC. (FOR MSI)

(57) ABSTRACT

A device, system and method for routing botnet calls to a botnet call-answer queue. A device, such as a call answering point (CAP) and/or a public-safety answering point (PSAP) router device, receives a call and determines an audio signature of the call. The device compares the audio signature of the call with one or more botnet audio signatures stored at a memory. In response to the audio signature of the call matching at least one of the one or more botnet audio signatures, the device: identifies the call as a botnet call that has been placed by a botnet; and cause the call to be routed to a botnet call-answer queue.

20 Claims, 7 Drawing Sheets

(56) References Cited

U.S. PATENT DOCUMENTS

| | | | |
|---|---|---|---|
| 2007/0150276 A1* | 6/2007 | Srivastava | H04L 65/1079 704/246 |
| 2014/0044017 A1 | 2/2014 | Haltom | |
| 2015/0047042 A1 | 2/2015 | Haikney et al. | |
| 2015/0058976 A1 | 2/2015 | Carney et al. | |
| 2016/0173527 A1 | 6/2016 | Kasman et al. | |
| 2017/0026404 A1 | 1/2017 | Peeler | |
| 2019/0141061 A1 | 5/2019 | Krishtal et al. | |

OTHER PUBLICATIONS

Guri, Mordechai, et al., 1609.02353.PDF: 9-1-1 DDoS: Threat, Analysis and Mitigation, Published on Sep. 8, 2016 at "arXiv:1609.02353" https://arxiv.org/abs/1609.02353.

* cited by examiner

DEVICE, SYSTEM AND METHOD FOR ROUTING BOTNET CALLS TO A BOTNET CALL-ANSWER QUEUE

BACKGROUND OF THE INVENTION

A malicious entity, such as a hacker, and the like, may gain access to thousands of mobile phones, and the like, install a bot on the mobile phones, and use the bot at the mobile phones (e.g. which form a botnet) to launch a distributed denial of service (DDoS) attack at a public-safety answering point (PSAP) system or other call-answering point systems. For example, the bots installed on the mobile phones may be used to make thousands of 911 calls to the PSAP (and/or other types of calls). Such a DDoS attack may disrupt operations of the PSAP and/or other call-answering point systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
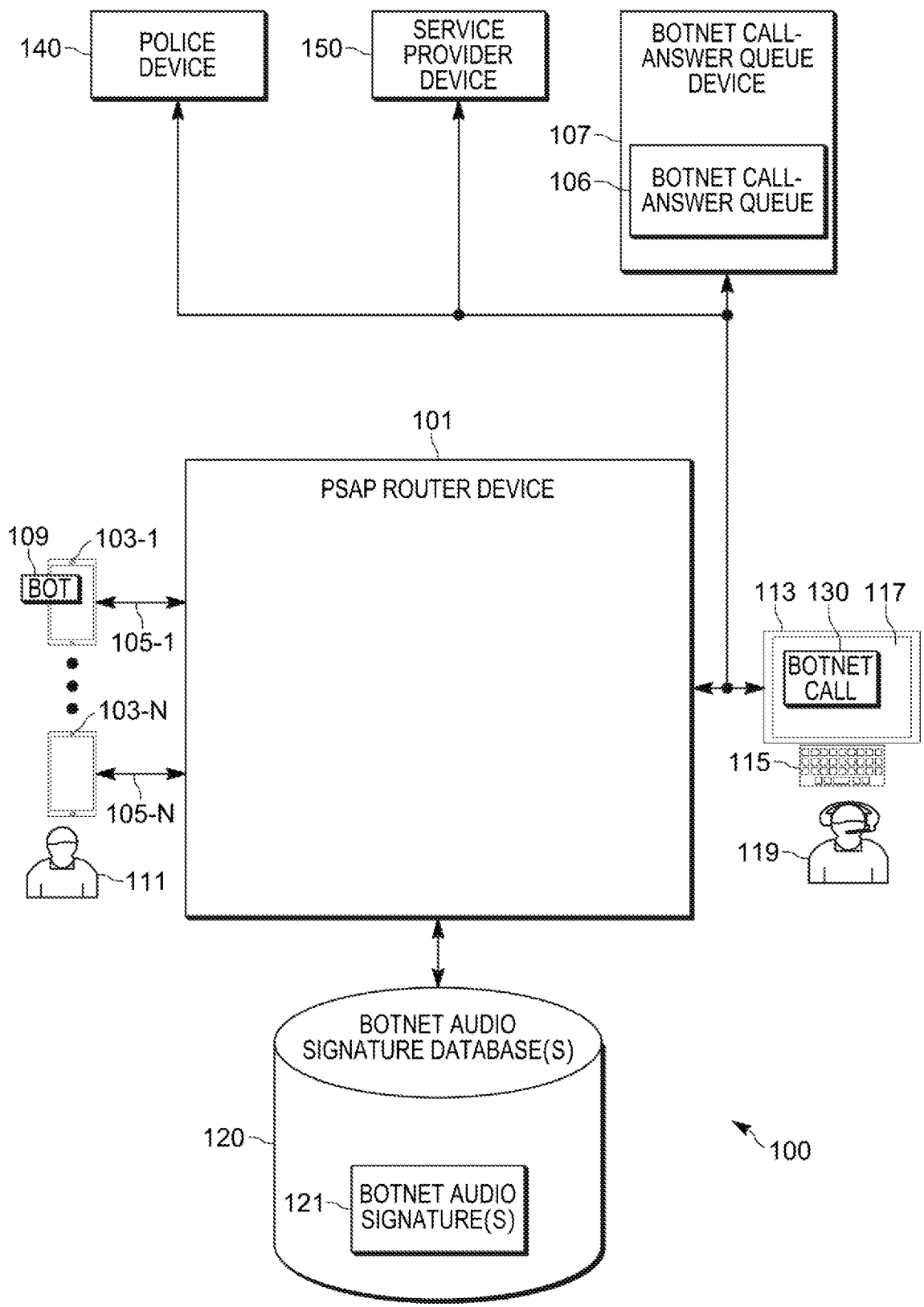
FIG. 1 is a system for routing botnet calls to a botnet call-answer queue, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A malicious entity, such as a hacker, and the like, may gain access to thousands of mobile phones, and the like, install a bot on the mobile phones, and use the bot at the mobile phones (e.g. which form a botnet) to launch a distributed denial of service (DDoS) attack at a public-safety answering point (PSAP) system or other call-answering point (CAP) systems. For example, a bot of a botnet is understood to include malware and/or software installed at a device, such as a mobile device, which may control the device to perform actions without authorization by a user of the mobile device (e.g. and without the knowledge of the user of the mobile device). A botnet may be formed by a plurality of devices which are processing the bots, and the botnet may be controlled to perform malicious actions in a coordinated manner. For example, the bots installed on the mobile phones may be used to make thousands of 911 calls (and/or other types of calls) to the PSAP and/or CAP. Such a DDoS attack may disrupt operations of the PSAP and/or other CAP systems. Such a DDoS attack may disrupt operations of the PSAP and/or CAP. Hereafter, reference is made to actions being carried out by a bot of a botnet, and the botnet, however it is understood that actions of the botnet are generally implemented by bots installed on devices that make up the botnet.

It can be challenging, however, to blacklist given phone numbers of the mobile phones making the 911 calls, and the like, for the botnet. For example, the botnet can randomize the device's cellular subscriber identification module (SIM) information (e.g., such as an international mobile subscriber identifier (IMSI)) and/or device identifier (e.g., such as an international mobile equipment identifier (IMEI)) each time prior to making a fraudulent call. Furthermore, some jurisdictions may require wireless providers to forward 911 calls, and the like, to a PSAP and/or CAP regardless of caller validation. Hence, a PSAP operator and/or CAP operator taking a fraudulent call may need to listen to the fraudulent call for at least a period of time to identify the call as fraudulent and hang up. Furthermore, tens to hundreds of PSAP operators and/or CAP operators may get the same fraudulent call more than once, which adds to the disruption of the operations of the PSAP and/or CAP.

Hence, provided herein is a device, system and method for routing calls to a botnet call-answer queue based on comparing an audio signature of a call matching one or more predetermined botnet audio signatures. In particular, a botnet may use prerecorded audio on a fraudulent call in a DDoS attack, which may be used to identify the fraudulent call and/or the DDoS attack. As such, audio signatures of calls that are determined to be botnet calls may be stored at the memory. As further calls are received at a PSAP router device, and/or a CAP router device, the PSAP router device and/or the CAP router device determines an audio signature of the call and compares the audio signature to one or more botnet audio signatures stored at the memory. When the audio signature of the call matches one or more of the botnet audio signatures, the call is identified as a botnet call and routed to a botnet answer queue where, for example, the botnet call may be held indefinitely (e.g. on hold), and the like, and/or for any suitable time period. In the botnet answer queue, the botnet call may be analyzed to determine a location of the phone making the botnet call and/or any other suitable information about the botnet call may be determined. In some examples, the botnet call may be held for at least a given time period that is long enough for given botnet call analysis, and/or for an investigation and/or for an action to be carried out that and/or for different types of analyses to be carried out, such as locating, tracking and/or confiscating a mobile phone that is infected by a bot of the botnet, and the like. Regardless, the botnet call is prevented from being routed to a PSAP operator device (e.g., and/or CAP operator device) and/or generally prevented from using call-answering resources at the PSAP system and/or CAP system, which may mitigate a DDoS attack. Furthermore, the longer a botnet call is held, the longer the botnet is prevented from making a subsequent future botnet call or DDoS attack.

An aspect of the present specification provides a method comprising: receiving, at a call answering point (CAP) router device, a call; determining, at the CAP router device, an audio signature of the call; comparing, at the CAP router device, the audio signature of the call with one or more botnet audio signatures stored a memory; in response to the audio signature of the call matching at least one of the one or more botnet audio signatures: identifying, at the CAP router device, the call as a botnet call that has been placed by a botnet; and causing, via the CAP router device, the call to be routed to a botnet call-answer queue.

Another aspect of the present specification provides a device comprising: a communication unit; and a controller in communication with a memory and the communication unit, the controller configured to: receive a call; determine an audio signature of the call; compare the audio signature of the call with one or more botnet audio signatures stored at the memory; in response to the audio signature of the call matching at least one of the one or more botnet audio signatures: identify the call as a botnet call that has been placed by a botnet; and cause the call to be routed to a botnet call-answer queue.

Attention is directed to FIG. 1, which depicts an example PSAP system 100 for routing botnet calls to a botnet call-answer queue. The various components of the PSAP system 100 are in communication via any suitable combination of wired and/or wireless communication links, and communication links between components of the PSAP system 100 are depicted in FIG. 1, and throughout the present specification, as double-ended arrows between respective components; the communication links may include any suitable combination of wireless and/or wired links and/or wireless and/or wired communication networks, and the like.

While present examples are described with respect to a PSAP, in other examples, other call answering systems such as 311 call answering systems, commercial call answering systems, retail call answering systems, customer support call answering systems, and the like may leverage a same or similar technique as described herein. Put another way, references herein to PSAPs, PSAP systems, PSAP devices, PSAP operators, and the like may be replaced with CAPs, CAP systems, CAP devices, CAP operators, and the like. Put yet another way, it is understood that a PSAP is a specific example of a CAP and that other types of CAPs (as well as associated systems, devices and/or operators) are within the scope of the present specification. Similarly, references to 911 calls, and/or emergency calls, and the like, may be replaced with any suitable call to a PSAP.

The PSAP system 100 may be operated by an entity such as a 911 call center entity, and the like, for a jurisdiction such as a county, a city, a state, and the like. While references are made to "911" calls herein, it is understood that such 911 calls are emergency calls to a PSAP, and the like, and that some jurisdictions use a number other than "911" to initiate such calls (e.g. "999"). Hence, the term "911 call" and "emergency call" may be used interchangeably, and furthermore such terms include any suitable emergency call made using any suitable number to a PSAP.

The PSAP system 100 comprises a PSAP router device 101, which may comprise one or more servers and/or cloud computing devices, and the like, which are generally configured to answer calls, such as 911 calls. For example, when a caller and/or a bot uses a communication device to call "911", and the like, within a jurisdiction serviced by the PSAP system 100, the PSAP router device 101 may answer the call, for example as an automated PSAP call-answer device and/or as a reverse proxy device.

For example, as depicted, a number "N" of communication devices 103-1, . . . 103-N are making respective calls 105-1 . . . 105-N (e.g. via respective communication links), such as 911 calls, to the PSAP router device 101. As will be explained in more detail below, the PSAP router device 101 is further configured to determine whether one or more of the calls 105-1 . . . 105-N are botnet calls, based on audio signatures of the calls 105, and routes botnet calls to a botnet call-answer queue 106 at a botnet call-answer queue device 107, where botnet calls may be held indefinitely and/or for any suitable time period. In particular, in the botnet call-answer queue 106, a call 105 may be placed on hold and/or answered by a non-human and/or virtual operator (e.g. such as an artificial intelligence operator, and the like) and/or a call 105 may be answered and recordings may be played and/or no recordings may be played. Hence, in the botnet call-answer queue 106, the botnet call-answer queue device 107 implements any suitable actions which may hold a call 105 in in the botnet call-answer queue 106 in any suitable state (e.g. a hold state, an active state, an answered state) indefinitely and/or for any suitable time period.

The communication devices 103-1, . . . 103-N are interchangeably referred to hereafter, collectively, as the communication devices 103 and, generically, as a communication device 103. This numbering convention will be used throughout the present specification. For example, the calls 105-1 . . . 105-N are interchangeably referred to hereafter, collectively, as the calls 105 and, generically, as a call 105.

Furthermore, while only two (e.g., N=2) communication devices 103 and calls 105 are depicted, the PSAP router device 101 may be configured to answer calls from as few as one communication device 103 making one call 105, to a plurality of communication devices 103 making respective calls 105. In particular, hundreds to thousands of communication devices 103 may be making hundreds to thousands of calls 105 to the PSAP router device 101. In some examples, the PSAP router device 101 may be configured to answer at least a portion of the calls 105 concurrently, and/or may otherwise receive the calls 105 consecutively.

Furthermore, while the communication devices 103 are depicted as mobile devices, the communication devices 103 may comprise any suitable communication devices for making a call and/or a 911 call to the PSAP router device 101 including, but not limited to, the depicted mobile devices, public switched telephone network (PSTN) telephones, Internet Protocol (IP) telephones, laptops, personal computers, and the like. Furthermore, the calls 105 to the PSAP router device 101 may occur via any suitable combination of wireless and/or wired networks and may include, but are not limited to, mobile phone calls, PSTN calls, IP calls, calls made using applications, and the like.

As depicted, one or more of the communication devices 103 has been "hacked" and the like, to install a bot 109 to make a call 105 therefrom, for example in a DDoS attack. As depicted, for example, the communication device 103-1 has been "infected" with the bot 109, which has initiated the call 105-1, while the communication device 103-N is being operated by a caller 111 to initiate the call 105-N. Hence, the call 105-1 may comprise a botnet call, while the call 105-N is not a botnet call. While only the communication device 103-1 is depicted as being operated by the bot 109, in a DDoS attack tens to hundreds to thousands of the communication devices 103 may be operated by the bot 109.

As depicted, the PSAP system 100 further comprises a PSAP operator device 113 in communication with the PSAP router device 101 via a communication link. As depicted, the PSAP operator device 113 may comprise a terminal and/or a dispatch terminal to which the PSAP router device 101 may forward a call 105 that has not been determined by the PSAP router device 101 to be a botnet call. The PSAP operator device 113 generally comprises at least one input device 115, such a keyboard (as depicted), a pointing device, and the like, as well as a display screen 117 and/or a notification device (e.g. a speaker, and the like). The PSAP operator device 113 is generally operated by a human user, for example, as depicted, a PSAP operator 119 and/or call-taker, such as a public safety and/or private security call taker, a 911 call taker, a dispatcher, and the like.

While only one PSAP operator device 113 and PSAP operator 119 is depicted, the PSAP system 100 may comprise any suitable number of PSAP operator devices 113 and PSAP operators 119. Furthermore, the PSAP operator device 113 and the PSAP operator 119 may be local to other components of the PSAP system 100 and/or a PSAP facility (e.g. in an "at work" situation), or the PSAP operator device 113 and the PSAP operator 119 may be remote from other components of the PSAP system 100 and/or the PSAP facility (e.g. in a "work from home" situation).

As depicted, the PSAP system 100 further comprises a memory 120, which may be provided in the form of one or more botnet audio signature databases, and the like. The memory 120 stores one or more botnet audio signatures 121. For example, it is understood that when one or more previous calls 105 to the PSAP router device 101 were determined to be botnet calls, botnet audio signatures 121 thereof were determined and stored at the memory 120.

Furthermore, while not depicted, the PSAP system 100 may comprise other components, such as call-handling components, call-switching components, call queue components (e.g. for queuing non-botnet calls), and the like. In some examples, the botnet call-answer queue device 107 may also be operated by the entity operating the PSAP system 100; however, in other examples, the botnet call-answer queue device 107 may be operated by a different entity, such as law-enforcement entity (e.g. such as a police entity, a cybercrimes division of a police entity, and the like), a service provider entity (e.g. telephone company) and the like.

Operation of the PSAP router device 101 is next described in more detail.

When a call 105 is received, the PSAP router device 101 may answer the call 105, and may play an initial message on the call 105, for example providing information that a PSAP and/or 911 call center has answered the call 105. When the bot 109 has initiated the call 105 (e.g. the call 105-1), the bot 109 may play prerecorded audio. When a caller 111 has initiated the call (e.g. the call 105-N), the caller 111 may speak on the call. Regardless, the PSAP router device 101 generally determines an audio signature of the call 105.

Such an audio signature of a call 105 may include, but is not limited to, at least one of: identified voice signatures; identified audio content; ambient audio signatures, and the like. For example, a voice signature of a call 105, as determined by the PSAP router device 101, may comprise a voice print, and the like, of a human voice (e.g. a frequency spectrum of a voice on the call 105). Similarly, audio content, as determined by the PSAP router device 101, may comprise an audio print (e.g. a frequency spectrum of audio on the call 105) of other audio content, such as a dog barking, a car honking, and the like. Similarly, an ambient audio signature, as determined by the PSAP router device 101, may comprise an audio signature of background noise and the like, such as wind noise, and/or hissing noises, and/or crackling noises and the like.

In some specific examples, an audio signature may be provided in the form of one or more audio waveforms of a call 105 (e.g. an amplitude of audio signals, as a function of time and/or frequency), one or more Fourier transforms of audio waveforms of a call 105, one or more frequency patterns and/or frequency spectrums of a call 105, words (e.g. sentences) used on a call 105 (as determined via a speech-to-text application and/or an applied speech-to-text transcription), and the like.

The PSAP router device 101 may be configured to isolate voice signatures, the other audio content and/or the ambient noise. In these examples, an audio signature may include separate audio signatures and/or Fourier transforms of audio signatures and/or frequency patterns and/or frequency spectrums, and the like, for identified voices, identified audio content and/or ambient audio. For example, an audio signature may comprise an audio signature of an identified voice (e.g. as filtered from other audio on a call 105), an audio signature of identified audio content (e.g. as filtered from other audio on a call 105), and audio signature of audio signature of ambient noise (e.g. as filtered from other audio on a call 105). However, an audio signature may comprise one audio signature for combined audio of a call 105.

The one or more botnet audio signatures 121 generally have a similar format as audio signatures determined for calls 105. Hence, in general, an audio signature of a call 105 and the one or more botnet audio signatures 121 may comprise at least one of: respective identified voice signatures; respective identified audio content; and respective ambient audio signatures.

In some examples, features and/or characteristics of an audio signature of a call 105 and the one or more botnet audio signatures 121 may be reducible to features and/or characteristics searchable in a database lookup (e.g. a list of frequencies, relative ratios thereof, relative bandwidths thereof, words and/or sentences, and the like), for example to facilitate a comparison between audio signatures of calls 105 and the one or more botnet audio signatures 121.

The PSAP router device 101 may compare an audio signature of a call 105 to the one or more botnet audio signatures 121 to determine whether the audio signature of a call 105 matches one or more of the botnet audio signatures 121. When a match occurs (as described in more detail below), the PSAP router device 101 identifies the call 105 as a botnet call and causes the call 105 to be routed to the botnet call-answer queue 106 at the botnet call-answer queue device 107. However, when a match does not occur between the audio signature of the call 105 and one or more of the botnet audio signatures 121, the PSAP router device 101 routes the call 105 to the PSAP operator device 113 (and/or a call-answer queue thereof) where the call 105 is answered by the PSAP operator 119.

However, in some examples, where an audio signature of a call 105 does not match one or more of the botnet audio signatures 121, the call 105 may still be a botnet call. For example, at the beginning of a DDoS attack, an audio signature of botnet calls in the DDoS attack may not be stored at the memory 120. As such the call 105 may be routed to the PSAP operator device 113 where the call 105 is answered by the PSAP operator 119. The PSAP operator 119 may listen to the call 105 and determine that the call 105 is a botnet call. Rather than hang-up, however, the PSAP operator 119 may actuate, via the input device 115, an electronic soft button 130 provided at the display screen 117 (and/or, in other examples, a dedicated hard button of an input device 115, and the like, which may be provided separate from the display screen 117, among other possibilities), which identifies, to the PSAP router device 101, that the call 105 is a botnet call. In response, the PSAP router device 101 may store the audio signature of the call 105 at the memory 120 as a botnet audio signature 121. Hence, when audio signatures of future calls (e.g. in the DDoS attack) are compared against the botnet audio signature 121, the PSAP router device 101 may further reroute the call 105 to the botnet call-answer queue 106 at the botnet call-answer queue device 107.

Alternatively, in some examples, where an audio signature of a call 105 does not match one or more of the botnet audio signatures 121, and where the call 105 may be a botnet call, the PSAP router device 101 may store the audio signature of the call 105 at a memory (e.g. the memory 120 and/or another suitable memory) and count further calls 105 having respective audio signatures that match the audio signature of the call 105. When a number of the further calls 105 reaches a threshold number within a given time period, the PSAP router device 101 may identify the audio signature as a botnet audio signature 121 and store the botnet audio signature 121 at the memory 120 (e.g. if not already stored). Thereafter, the PSAP router device 101 may cause yet further calls 105 having the botnet audio signature 121 to be routed to the botnet call-answer queue 106. Hence, the PSAP router device 101 may count calls 105 that have a same and/or similar audio signature that are received within a given time period, and when a threshold number of such calls 105 are received, the PSAP router device 101 identifies such calls 105 are botnet calls and routes future calls having the same and/or similar audio signature to the botnet call-answer queue 106. The given time period may be generally selected to be commensurate with a DDoS attack. For example, to be effective, such DDoS attacks tend to occur in a short period of time (e.g. as short as 5 to 10 minutes, but a DDoS attack may occur for shorter or longer periods of time); as such, the given period of time, during which calls 105 having a same and/or similar audio signature are counted, may be in a range of 1 to 5 minutes, though any suitable given time period is within the scope of the present specification. Similarly, the threshold number may be selected to be commensurate with a DDoS attack and may be in a range of 5 calls to 10 calls, though any suitable threshold number of calls 105 is within the scope of the present specification.

While two examples of populating the botnet audio signatures 121 at the memory 120 are described (e.g. via the electronic soft button 130 and threshold-based counting of calls 105 having a same and/or similar audio signatures), any suitable process for populating the botnet audio signatures 121 at the memory 120 is within the scope of the present specification. For example, in a cloud-based deployment of PSAP systems, a cloud based server may monitor DDoS attacks at a plurality of PSAP systems (e.g. for different jurisdictions) and cross-populate botnet audio signatures 121 determined at respective PSAP router devices across the PSAP systems. Hence, for example, the botnet audio signatures 121 may comprise audio signatures of botnet calls received at PSAP router devices of PSAP systems of a jurisdiction different from the jurisdiction operating the PSAP system 100

For completeness, also depicted in FIG. 1, is a police device 140 and a service provider device 150, which may be optional. The devices 140, 150 may be respectively operated by a police entity and a service provider entity. In some examples, in response to an audio signature of a call 105 matching at least one of the one or more botnet audio signatures 121, the PSAP router device 101 may cause a notification to be transmitted to one or more of the police device 140 and the service provider device 150, for example, to notify a police entity and/or a service provider entity that a DDoS attack may be underway.

Figure 2:
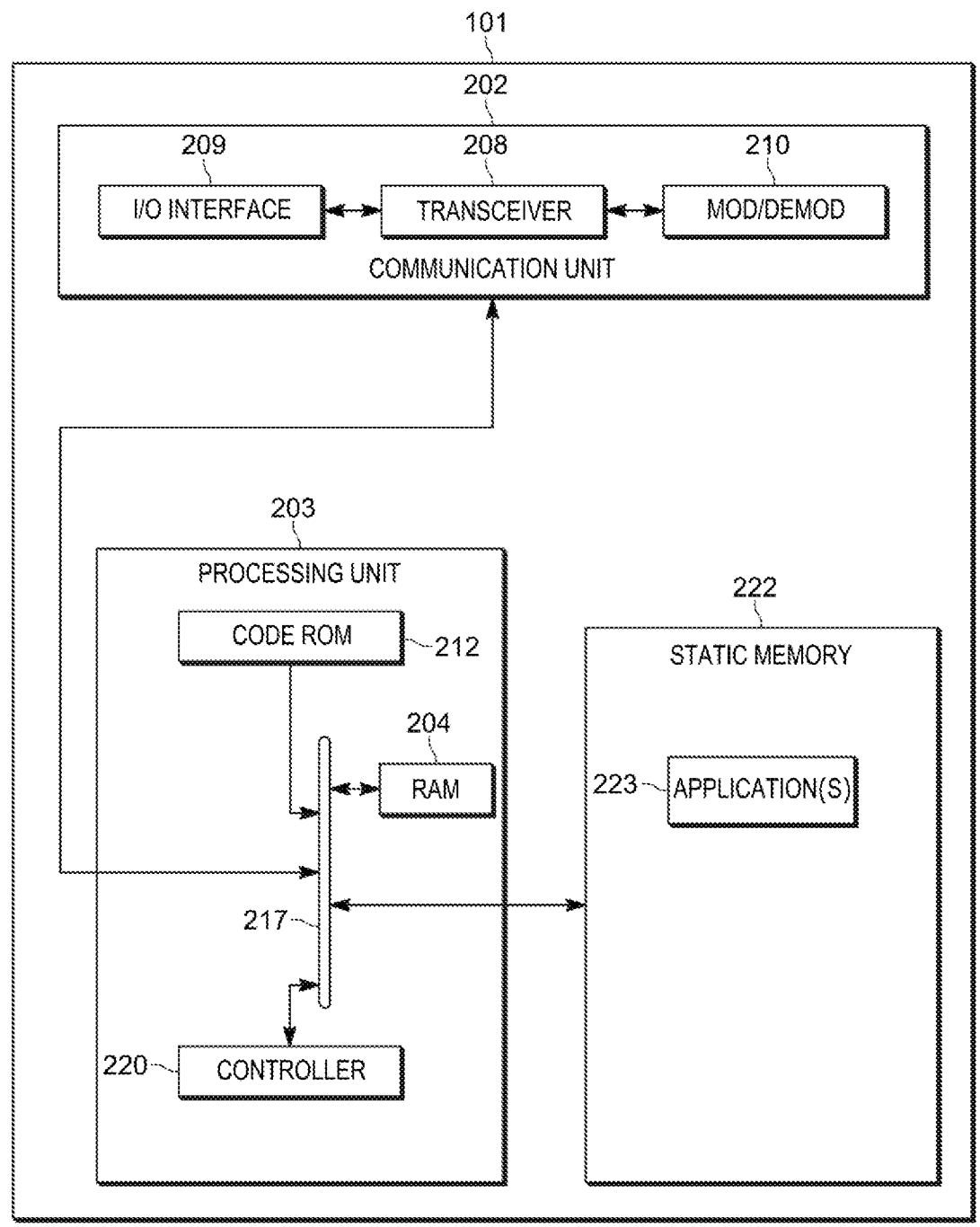
FIG. 2 is a device diagram showing a device structure of computing device for routing botnet calls to a botnet call-answer queue, in accordance with some examples.

Attention is next directed to FIG. 2, which depicts a schematic block diagram of an example of the PSAP router device 101. In general, the PSAP router device 101 may comprise one or more servers and/or one or more cloud computing devices, and the like, configured to communicate with communication devices 103, the PSAP operator device 113, the devices 140, 150 and/or any other suitable components of the PSAP system 100. However, the PSAP router device 101 may comprise a computing device such as a personal computer and/or a laptop computer, and the like. The PSAP router device 101 may be located at a PSAP facility and/or with other components of the PSAP system 100, and the like, and/or the PSAP router device 101 may be remote from a PSAP facility and/or remote from other components of the PSAP system 100, and the like.

As depicted, the PSAP router device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the PSAP router device 101 may include one or more of an input device and a display screen and the like, a microphone (e.g., to receive voice commands) such that a user (e.g., an administrator of a PSAP system), may interact with the PSAP router device 101 for example to configure components thereof. However, a terminal, such as the PSAP operator device 113 may alternatively be used to configure components of the PSAP router device 101.

As shown in FIG. 2, the PSAP router device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the devices 103, 113, 140, 150, and/or any other suitable component of the PSAP system 100. For example, the communication unit 202 may include one or more transceivers 208 and/or wireless transceivers for communicating with the devices 103, 113, 140, 150, and/or any other suitable component of the PSAP system 100 via any suitable combination of one or more communication networks. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g, 802.11n, 802.11ac), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g., hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the PSAP router device 101 is not a generic controller and/or a generic device, but a device specifically configured to implement functionality for routing botnet calls to a botnet call-answer queue. For example, in some examples, the PSAP router device 101 and/or the controller 220 specifically comprises a computer executable engine configured to implement functionality for routing botnet calls to a botnet call-answer queue.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the PSAP router device 101 as described herein are maintained, persistently, at the memory 222 and used by the controller 220, which makes appropriate utilization of volatile storage during the execution of such programming instructions.

Figure 3:
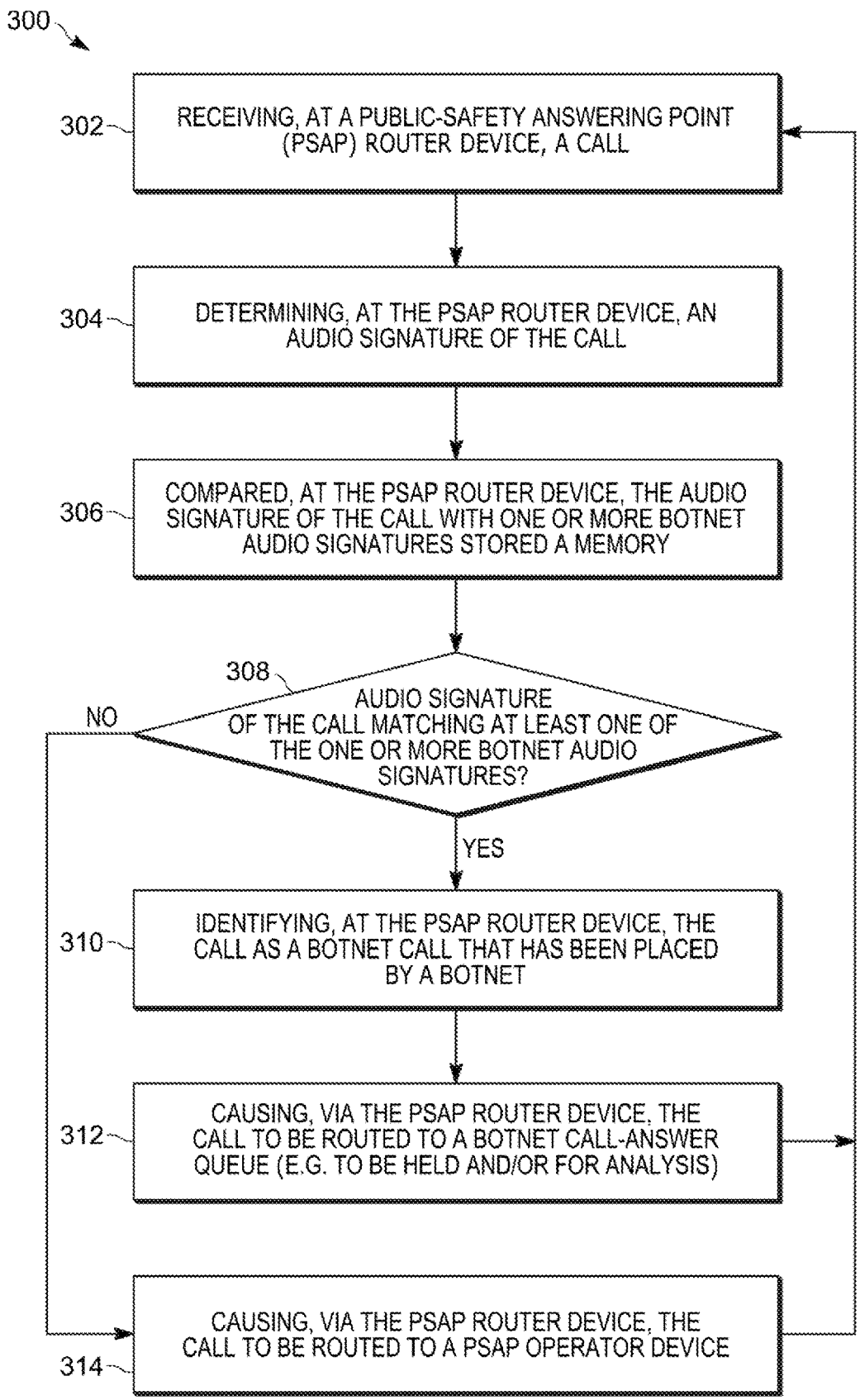
FIG. 3 is a flowchart of a method for routing botnet calls to a botnet call-answer queue, in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3.

While not depicted, the memory 222 may further include the memories 120 and/or the memory 222 may store the botnet audio signatures 121.

Furthermore, while not depicted, the memory 222 and/or the application 223 may include a speech-to-text module and/or application, for example to determine words and/or sentences on a call and/or speech-to-text transcripts of a call. Similarly, while not depicted, the memory 222 and/or the application 223 may include a spectrum analyzer, and the like, for example to determine frequencies on a call and/or a frequency spectrum of a call.

In illustrated examples, when the controller 220 executes the one or more applications 223, the controller 220 is enabled to: receive a call; determine an audio signature of the call; compare the audio signature of the call with one or more botnet audio signatures stored a memory; in response to the audio signature of the call matching at least one of the one or more botnet audio signatures: identify the call as a botnet call that has been placed by a botnet; and cause the call to be routed to a botnet call-answer queue.

The application 223 may include numerical algorithms configured to determine whether audio signatures match and/or perform any other suitable functionality of the PSAP router device 101.

Alternatively, and/or in addition to numerical algorithms, the application 223 may include machine learning models and/or algorithms, and the like, which have been trained to determine whether audio signatures match and/or perform any other suitable functionality of the PSAP router device 101. The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments, such as a PSAP system. Any suitable machine learning algorithm and/or deep learning algorithm and/or neural network is within the scope of present examples.

The PSAP router device 101 may include any other suitable components. In some examples, the PSAP router device 101 may include call-switching components (e.g. electronic switches) for routing calls 105 as described herein and the PSAP router device 101 may route calls 105 by internally controlling such call-switching components. However, in other examples, the PSAP router device 101 may not include such call-routing components and/or switches but may be configured to control such call-switching components, which may be components of other servers, and the like, of the PSAP system 100.

While details of the devices 103, 107, 113, 140, 150 are not depicted, such devices 103, 107, 113, 140, 150 may have components similar to the PSAP router device 101 adapted, however, for the respective functionality of the devices 103, 107, 113, 140, 150. For example, the communication devices 103 are generally configured to make the calls 105 and include respective suitable transceivers. Similarly, the PSAP operator device 113 is generally configured to receive the calls 105 as routed, and include respective suitable transceivers. The botnet call-answer queue 107 is generally configured to receive the calls 105 as routed, and include respective suitable transceivers, as well as one or more controllers, one or more memories, and the like, configured to maintain the botnet call-answer queue 106. The devices 140, 150 may comprise communication devices configured to receive and provide notifications and hence may include suitable transceivers and notification devices for implementing such functionality.

Attention is now directed to FIG. 3, which depicts a flowchart representative of a method 300 for routing botnet calls to a botnet call-answer queue. The operations of the method 300 of FIG. 3 correspond to machine readable instructions that are executed by the PSAP router device 101, and specifically the controller 220 of the PSAP router device 101. In the illustrated example, the instructions represented by the blocks of FIG. 3 are stored at the memory 222 for example, as the application 223. The method 300 of FIG. 3 is one way that the controller 220 and/or the PSAP router device 101 and/or the PSAP system 100 may be configured. Furthermore, the following discussion of the method 300 of FIG. 3 will lead to a further understanding of the PSAP system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the PSAP system 100 of FIG. 1, as well; for example, as described above, the method 300 may be implemented at any suitable CAP router device and/or at any suitable CAP system, which receives calls from communication devices 103 (e.g., which may include 911 calls and/or any suitable type of call).

At a block 302, the controller 220 and/or the PSAP router device 101 (and/or a CAP router device) receives a call 105. For example, as described above, a communication device 103 may call 911 and a respective call 105 to the PSAP router device 101 may be initiated and received at the PSAP router device 101.

At a block 304, the controller 220 and/or the PSAP router device 101 determines an audio signature of the call 105 received at the block 302. As described above, such an audio signature may comprise one or more of identified voice signatures, identified audio content, ambient audio signatures, and the like, in any suitable format. For example, a spectrum analyzer of the PSAP router device 101 may be used to determine one or more frequency spectrums of the call 105 (e.g. to determine a voice print, which may comprise a frequency spectrum of a voice on the call 105); and/or a speech-to-text module of the PSAP router device 101 may be used to determine words and/or sentences on the call 105.

At a block 306, the controller 220 and/or the PSAP router device 101 compares the audio signature of the call 105, received at the block 302, with one or more botnet audio signatures 121 stored the memory 120 (e.g., and/or at the memory 222 and/or another suitable memory).

For example, the controller 220 and/or the PSAP router device 101 may compare features, and the like, such as a voice signature and/or audio content and/or an ambient audio signature, with respective features and/or characteristics of the one or more botnet audio signatures 121. In some examples, such a comparison may occur via a database lookup at the memory 120, and the like for example, when the features of the botnet audio signatures 121 (e.g. and the audio signature of the call 105) are reducible to features and/or characteristics searchable in a database lookup (e.g. a list of frequencies, relative ratios thereof, relative bandwidths thereof, words and/or sentences, and the like).

For example, in a comparison, the controller 220 and/or the PSAP router device 101 may compare frequencies and, the like, of the audio signature of the call 105 with one or more botnet audio signatures 121 to determine whether any of the one or more botnet audio signatures 121 include similar frequencies and/or same frequencies, for example in similar ratios thereof and the like. Such a comparison may include, but is not limited to, determining whether a voice signature of the audio signature of the call 105 matches a respective voice signature of one or more of the botnet audio signatures 121.

In yet further examples, a comparison between the audio signature of the call 105, received at the block 302, with the one or more botnet audio signatures 121 stored the memory 120, may include, but is not limited to, comparing words in the audio signature of the call 105, with respective words of the one or more botnet audio signatures 121, for example to search for similar phrases and/or sentences.

However, the controller 220 and/or the PSAP router device 101 may be configured to use any suitable process for comparing an audio signature of a call 105 with the one or more of the botnet audio signatures 121, for example to determine whether there is a match. For example, relative positions and/or relative amplitudes of various peaks in frequencies, and the like, of the audio signature of the call 105 and the one or more of the botnet audio signatures 121 may be used to determine a match. Similarly, same words and/or sentences of the audio signature of the call 105 and the one or more of the botnet audio signatures 121 may be used to determine a match.

At a block 308, the controller 220 and/or the PSAP router device 101 determines whether the audio signature of the call 105 matches at least one of the one or more botnet audio signatures 121.

In some examples, the audio signature of the call 105 may exactly match at least one of the one or more botnet audio signatures 121. For example voice prints thereof may be identical and/or the audio signature of the call 105 and the one or more of the botnet audio signatures 121 may include the same and/or identical words and/or sentences.

However, a match between the audio signature of the call 105 and one or more of the botnet audio signatures 121 may be determined when they do not exactly match. For example, the controller 220 and/or the PSAP router device 101 may determine that the audio signature of the call 105 matches a botnet audio signature 121 using one or more threshold values and/or confidence threshold values (e.g. as configured at the application 223). For example, when a match between the audio signature of the call 105 and a botnet audio signature 121 is determined within a 90% confidence level, the controller 220 may determine that the audio signature of the call 105 and a botnet audio signature 121 match. However, a matching confidence level may be selected to be any suitable value, for example 70%, 80%, or 90%.

In response to the audio signature of the call 105 matching at least one of the one or more botnet audio signatures 121 (e.g. a "YES" decision at the block 308, such as may occur with the call 105-1), at a block 310, the controller 220 and/or the PSAP router device 101 identifies the call 105, received at the block 302, as a botnet call that has been placed by a botnet.

Furthermore, in response to the audio signature of the call 105 matching at least one of the one or more botnet audio signatures 121 (e.g. a "YES" decision at the block 308), at a block 312, the controller 220 and/or the PSAP router device 101 causes the call 105, received at the block 302, to be routed to a botnet call-answer queue 106 at the botnet call-answer queue device 107, for example, to be held and/or for analysis as described hereafter.

The block 310 may further include the controller 220 and/or the PSAP router device 101 storing the audio signature at the memory 120 as a botnet audio signature 121, and/or using the audio signature to augment and/or update the matching botnet audio signature 121. For example, as the controller 220 and/or the PSAP router device 101 identifies botnet calls, audio signatures of the botnet calls may be averaged with a matching botnet audio signature 121 already stored at the memory 120, and the averaged botnet audio signature 121 may replace the matching botnet audio signature 121, to improve an overall quality of the botnet audio signature 121 stored at the memory 120.

The block 312 may include the controller 220 and/or the PSAP router device 101 routing the call 105 to the botnet call-answer queue 106 at the botnet call-answer queue device 107, for example via call-switching components located at the PSAP router device 101. Alternatively, the block 312 may include the controller 220 and/or the PSAP router device 101 routing the call 105 to the botnet call-answer queue 106 at the botnet call-answer queue device 107 by controlling call-switching components and/or switches external to the PSAP router device 101 but located at other components of a PSAP system 100.

As described above, the botnet call-answer queue 106 at the botnet call-answer queue device 107 may be operated by a law-enforcement entity and/or a police entity, a service provider entity and the like and hence, routing the call 105 to the botnet call-answer queue 106 at the botnet call-answer queue device 107 may cause the call 105 to be routed out of the PSAP system 100 and to a police system and/or service provider system.

Once the call 105 is identified as a botnet call and routed to the botnet call-answer queue 106 (e.g. regardless of a location of the botnet call-answer queue device 107), the botnet call may be held indefinitely in the botnet call-answer queue 106 (e.g. the botnet call-answer queue 106 may comprise a queue at which a botnet call is held indefinitely).

In some examples, in response to the audio signature of the call 105 matching at least one of the one or more botnet audio signatures 121 (e.g. a "YES" decision at the block 308), the controller 220 and/or the PSAP router device 101 may cause a notification to be transmitted to one or more of the police device 140 and the service provider device 150, for example to notify one or more of the devices 140, 150 of a DDoS attack. As described above, such a transmission of a notification may be threshold based and may occur after a threshold number of calls 105 with a similar and/or a same audio signature (e.g. that matches a botnet audio signature 121) are received within a given time period. For example, such a threshold number and given time period may comprise 10 calls within about 1 to about 2 minutes, however such a threshold number and given time period may comprise any suitable number of calls and/or any suitable time period, and may be configurable at the PSAP router device 101 (e.g. by an administrator thereof). In some of these examples, the PSAP router device 101 may transmit a notification to one or more of the devices 140, 150, and in other examples, the PSAP router device 101 may control another component of the PSAP system 100 to transmit a notification to one or more of the devices 140, 150.

Such a notification to one or more of the devices 140, 150 may include metadata of the call 105 received at the block 302. Such metadata may include a phone number and/or an IMSI and/or an IMEI thereof. However such metadata may include a spoofed and/or simulated phone number and/or IMSI and/or IMEI. Regardless the metadata may be used by the police in an investigation of a DDoS attack and/or used by a service provider to notify a subscriber associated with the phone number and/or IMSI and/or IMEI in the metadata that their information and/or communication device is being used by a malicious entity and/or hacker, and the like.

In some examples, in response to the audio signature of the call 105 matching at least one of the one or more botnet audio signatures 121 (e.g. a "YES" decision at the block 308) the PSAP router device 101 and/or another component of the PSAP system 100 may perform analysis of the call 105. Such analysis may include, but is not limited to, identifying an originating location of the call 105 (e.g. the botnet call), which may be determined using device-based hybrid location systems, and the like, which may be deployed in the PSAP system 100.

Furthermore, analysis of the call 105 (e.g. the botnet call) may occur as the call 105 is being held in the botnet call-answer queue 106. For example, the analysis may include, but is not limited to, one or more of: identifying an originating location of the botnet call; identifying a call identifier (e.g. a telephone number, an IMSI and the like) of the botnet call; and identifying a device identifier of an originating communication device (e.g. an IMEI, and like), and/or any other data that may be received as metadata on the call 105 and/or botnet call, and/or which may be determined from network data (e.g. cellular triangulation data) associated with the call 105. As mentioned above, the metadata on the call 105 and/or botnet call may comprise information that has been spoofed.

As a botnet call may be held in the botnet call-answer queue 106 indefinitely and/or as analysis of a botnet call may occur in botnet call-answer queue 106, the botnet call-answer queue 106 may be referred to as a "honeypot" queue and/or the botnet call-answer queue device 107 may be referred to as a "honeypot" device, which attempts to hold a botnet call (e.g. in an active and/or answered state) as long as possible to mitigate a DDoS attack and/or to determine data that may lead to arrest and prosecution of an initiator of the DDoS attack. At such a honeypot queue, analysis of botnet calls held therein may be used to develop new cybersecurity solutions to stop the subsequent or future botnet DDOS attacks and/or to develop solutions to combatting malware similar to the bot 109.

Furthermore, in some examples, the PSAP system 100, and the like, may include two or more botnet call-answer queues and or botnet call-answer queue devices; for example, a first botnet call-answer queue and botnet call-answer queue device may be used to hold botnet calls indefinitely, while a second botnet call-answer queue and botnet call-answer queue device may be used to hold botnet calls indefinitely and perform analysis thereon. The PSAP router device 101 may cause a first portion of botnet calls to be routed to the first botnet call-answer queue and botnet call-answer queue device to be placed on hold, and a second portion of botnet calls to be routed to the second botnet call-answer queue and botnet call-answer queue device for analysis. As the analysis may use more processing resources than merely placing a botnet call on hold, the first portion of the botnet calls may comprise a larger fraction of a total number of botnet calls, and the second portion of the botnet calls may comprise a smaller fraction of the total number of botnet calls. For example, the PSAP router device 101 may select and/or randomly select a portion of the total number of botnet calls to be routed to the second botnet call-answer queue and botnet call-answer queue device for analysis in the DDoS attack.

After the block 312, the controller 220 and/or the PSAP router device 101 continues to receive calls at the block 302. However, it is understood that the controller 220 and/or the PSAP router device 101 may receive a plurality of calls 105, for example concurrently and/or consecutively, and may implement various instances of the method 300, in parallel and/or concurrently, as the calls 105 are received.

Returning to the block 308, in response to the audio signature of the call 105 not matching at least one of the one or more botnet audio signatures 121 (e.g. a "NO" decision at the block 308, such as may occur with the call 105-N, and/or with botnet calls that do not have botnet call signatures 121 stored at the memory 120), at a block 314, the controller 220 and/or the PSAP router device 101 causes the call 105 to be routed to the PSAP operator device 113 where the PSAP operator 119 may answer the call 105. However, when the PSAP operator device 113 is not available (and/or other PSAP operator devices 113 are not available, for example due to high call volume, such that the PSAP operators 119 are all engaged in taking calls), the call 105 may be placed in a "normal" call queue to wait for an available PSAP operator device 113 and/or an available PSAP operator 119.

In some examples, when the PSAP operator 119 answers the call 105, the PSAP operator 119 may determine that the call 105 is a botnet call, for example as audio on the call 105 may be prerecorded audio rather than a "live" caller, and/or the bot 109 is not responsive to questions by the PSAP operator 119 on the call 105, and/or the PSAP operator 119 may have heard the prerecorded audio on previous calls.

As has already been described, the PSAP operator device 113 may include an input device 115 that may be used for manually identifying a call 105 as a botnet call and/or a botnet-initiated call, such that when input is received from the input device 115 (e.g. to actuate the electronic soft button 130), the call 105 is routed to the botnet call-answer queue 106, a respective audio signature of the call 105 is generated and stored at the memory 120 as a botnet audio signature 121.

Thereafter, the controller 220 and/or the PSAP router device 101 continues to receive calls at the block 302 and, as previously described, the controller 220 and/or the PSAP router device 101 may receive a plurality of calls 105, for example concurrently and/or consecutively, and may implement various instances of the method 300, in parallel and/or concurrently, as the calls 105 are received.

In other examples, in response to the audio signature of the call 105 not matching at least one of the one or more botnet audio signatures 121 (e.g. a "NO" decision at the block 308), the method 300 may further comprise the controller 220 and/or the PSAP router device 101 implementing a threshold-based counting of calls 105 having similar and/or a same audio signature may be used to identify botnet calls, as described above.

For example, when call 105 is received that does not match at least one of the one or more botnet audio signatures 121, the controller 220 and/or the PSAP router device 101 may store the audio signature of the call 105 at a memory (e.g. the memory 120 and/or the memory 222 and/or another suitable memory), and count further calls 105 having respective audio signatures that match the audio signature. when a number of the further calls reaches a threshold number within a given time period, the controller 220 and/or the PSAP router device 101 may identify the audio signature as a botnet audio signature 121, which is thereafter stored at the memory 120 (e.g., if not already stored). The controller 220 and/or the PSAP router device 101 causes yet further calls having the botnet audio signature 121 to be routed to the botnet call-answer queue 106, as described above.

In other examples, the threshold-based counting of calls 105 having similar and/or a same audio signature, used to identify botnet calls, may be initiated when a call 105 is determined to be a non-service initiated call and/or an anonymous call. For example a non-service initiated call may comprise a 911 call from a communication device 103 that does not include a SIM card, and the like, and hence metadata thereof may not include a telephone number and/or an IMSI and/or an IMEI. Similarly, an anonymous call may comprise a 911 call where metadata thereof does not include a telephone number and/or an IMSI and/or an IMEI. Calls from such communication devices may have a higher probability of being used in a DDoS attack. Hence the controller 220 and/or the PSAP router device 101 may flag such calls as possibly being calls in a DDoS attack and store audio signatures thereof to compare against audio signatures of other calls 105 in the threshold-based counting of calls 105 having similar and/or a same audio signature, used to identify botnet calls.

For example, in response to the audio signature of the call 105 not matching at least one of the one or more botnet audio signatures 121 (e.g. a "NO" decision at the block 308), the method 300 may further comprise the controller 220 and/or the PSAP router device 101 implementing the threshold-based counting of calls 105 having similar and/or a same audio signature may be used to identify botnet calls, as initiated by determining that the call 105 comprises one or more of a non-service initiated call and an anonymous call.

For example, the controller 220 and/or the PSAP router device 101 may determine that the call 105 comprises one or more of a non-service initiated call and an anonymous call by analyzing metadata of the call 105. In response to determining that the call 105 comprises one or more of a non-service initiated call and an anonymous call, the controller 220 and/or the PSAP router device 101 may store the audio signature of the non-service initiated call and/or an anonymous call at a memory (e.g. the memory 120 and/or the memory 222 and/or another suitable memory). The controller 220 and/or the PSAP router device 101 may count further calls having respective audio signatures that match the audio signature. When a number of the further calls reaches a threshold number, the controller 220 and/or the PSAP router device 101 may identify the audio signature as a given botnet audio signature 121 at the memory 120, and cause yet further calls having the given botnet audio signature 121 to be routed to the botnet call-answer queue 106.

An example of the method 300 is next described with respect to FIG. 4, FIG. 5, FIG. 6 and FIG. 7, which are substantially similar to FIG. 1, with like components having like numbers.

Figure 4:
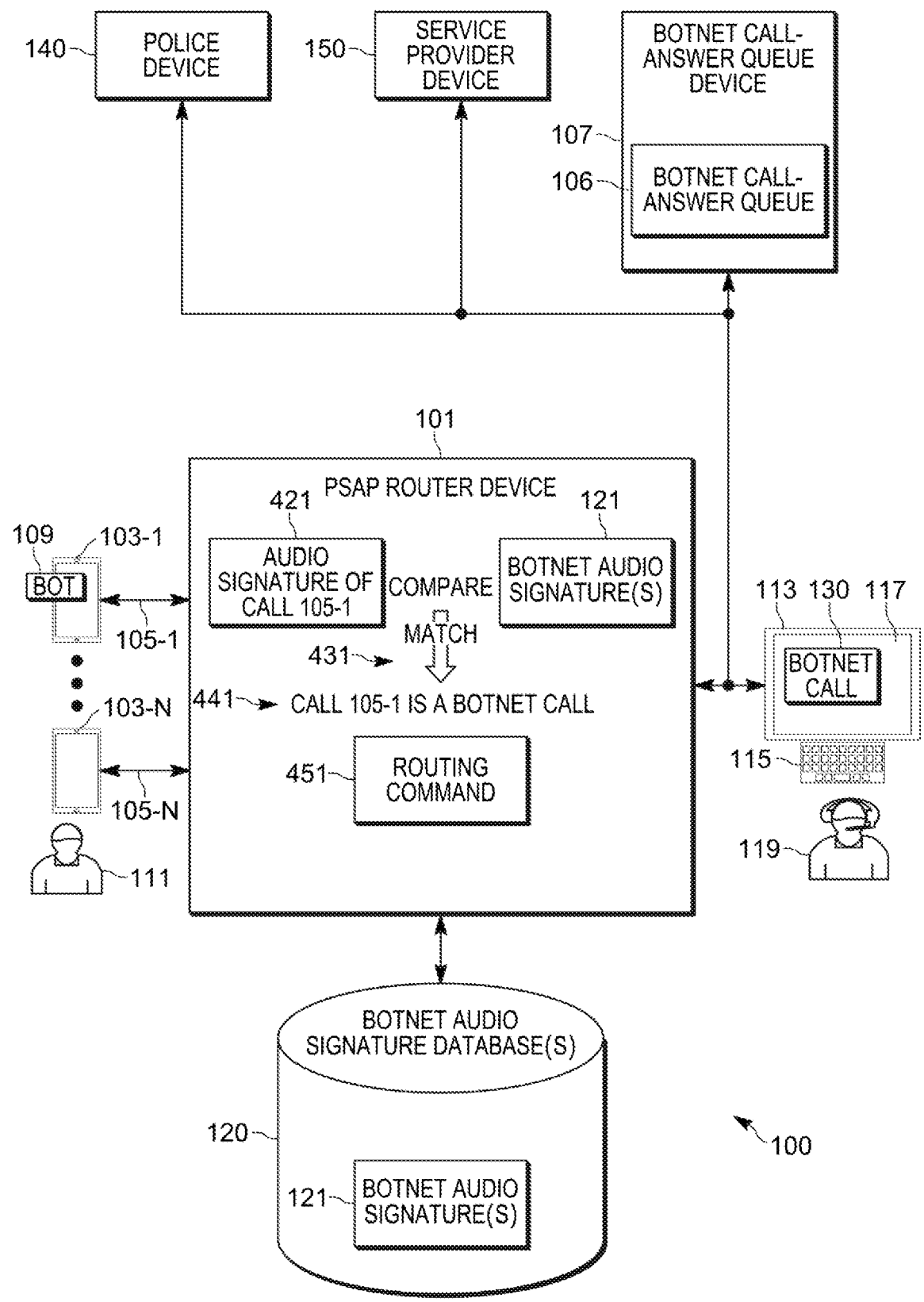
FIG. 4 depicts an example of a method for routing botnet calls to a botnet call-answer queue implemented in the system of FIG. 1, in accordance with some examples.

With reference to FIG. 4, the PSAP router device 101 is understood to be receiving (e.g. at the block 302 of the method 300) the call 105-1. The PSAP router device 101 determines (e.g. at the block 304 of the method 300) an audio signature 421 of the call 105-1, and compares (e.g. at the block 306 of the method 300) the audio signature 421 of the call 105-1 with the one or more botnet audio signatures 121. While as depicted the one or more botnet audio signatures 121 are retrieved from the memory 120, as described above, a comparison between the audio signature 421 of the call 105-1 and the one or more botnet audio signatures 121 may occur via a database lookup using determined features and/or characteristics of the audio signature 421 of the call 105-1.

As depicted in FIG. 4, the PSAP router device 101 determines that a match 431 has occurred (e.g. a "YES" decision at the block 308). Hence, it is understood that in the depicted example a botnet audio signature 121 is stored at the memory 120 that is similar to, and/or the same as, the audio signature 421.

As depicted, in response to the PSAP router device 101 determining that a match 431 has occurred, the PSAP router device 101 identifies (e.g. at the block 310 of the method 300) the call 105-1 as a botnet call. For example, as depicted, the PSAP router device 101 generates data 441, which identifies the call 105-1 as a botnet call. While the data 441 is depicted as text "Call 105-1 is a Botnet Call", such data 441 may be in any suitable format, for example a digital format in which "1" is used to identify a call as a botnet call, and "0" is used to identify a call as not a botnet call. Regardless, the data 441 may act as a flag, and the like, to cause the call 105-1 to be routed to the botnet call-answer queue 106.

For example, as also depicted in FIG. 4, the PSAP router device 101 may cause the call 105-1 to be routed to the botnet call-answer queue 106 (e.g. at the block 312 of the method 300) by generating a routing command 451. While not depicted, the routing command 451 may be transmitted to a call-switching component of the PSAP system 100 to cause the call 105-1 to be routed to the to the botnet call-answer queue 106 at the botnet call-answer queue device 107.

Figure 5:
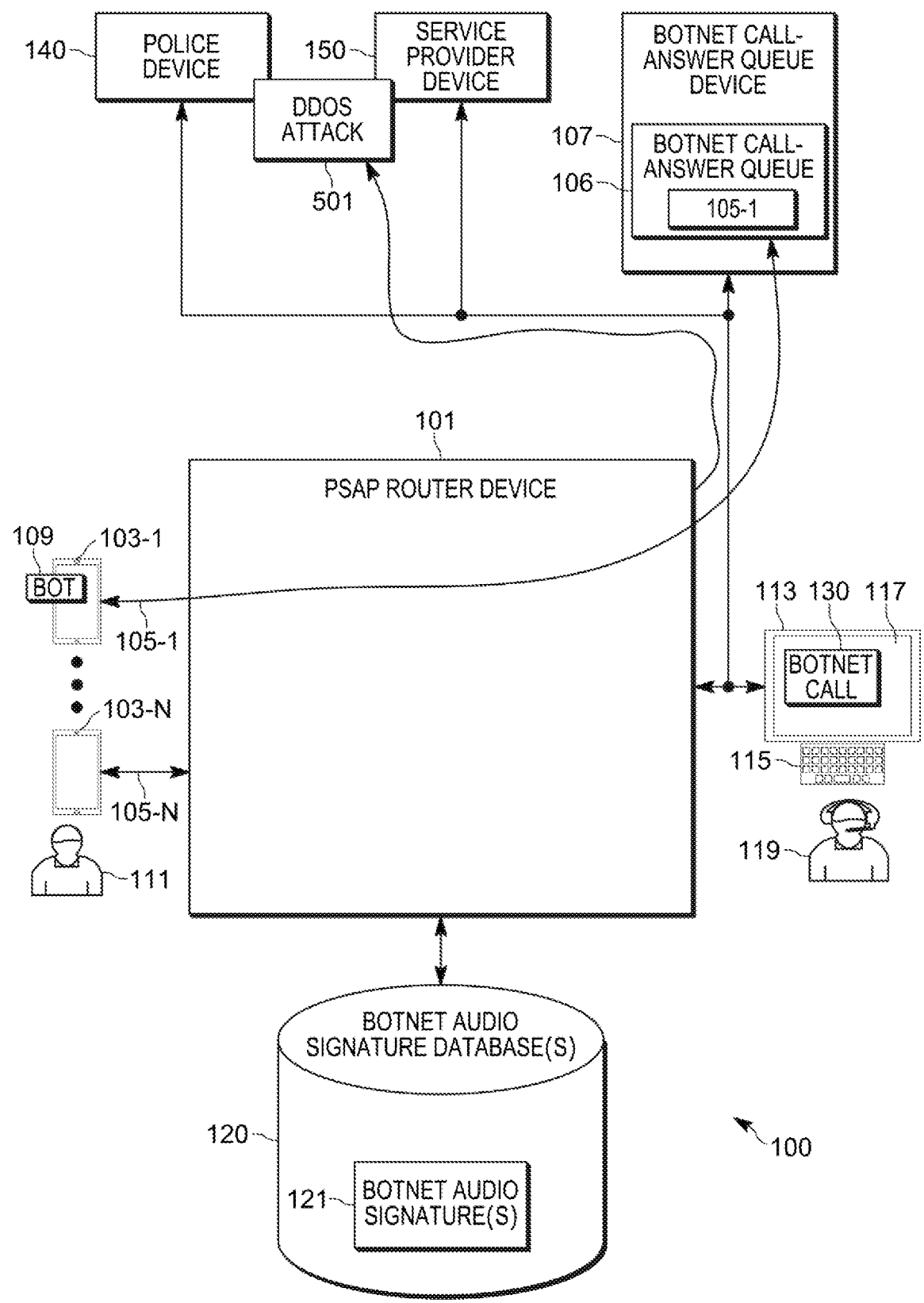
FIG. 5 depicts further aspects of the method for routing botnet calls to a botnet call-answer queue implemented in the system of FIG. 1, in accordance with some examples.

Hence, as depicted in FIG. 5, the call 105-1 may be routed to the botnet call-answer queue 106 at the botnet call-answer queue device 107, where the call 105-1 may be held indefinitely and at which analysis of the call 105-1 may occur. While the routing of the call 105-1 in FIG. 5 is depicted as being via the PSAP router device 101, such routing may occur via other components of the PSAP system 100, as described above.

As also depicted in FIG. 5, a notification 501 of a DDoS attack is transmitted to the devices 140, 150 to notify a law enforcement entity and/or service provider entity thereof. Hence, it is understood that the call 105-1 is not the first call in the DDoS attack and that a threshold number of calls in the DDoS attack may have occurred to trigger the notification 501 (e.g. from others of the communication devices 103). When the botnet call-answer queue 106 at the botnet call-answer queue device 107 is operated by the law enforcement entity and/or the service provider entity, the notification 501 may further trigger analysis of the call 105-1 (and/or other calls) in the botnet call-answer queue 106.

Figure 6:
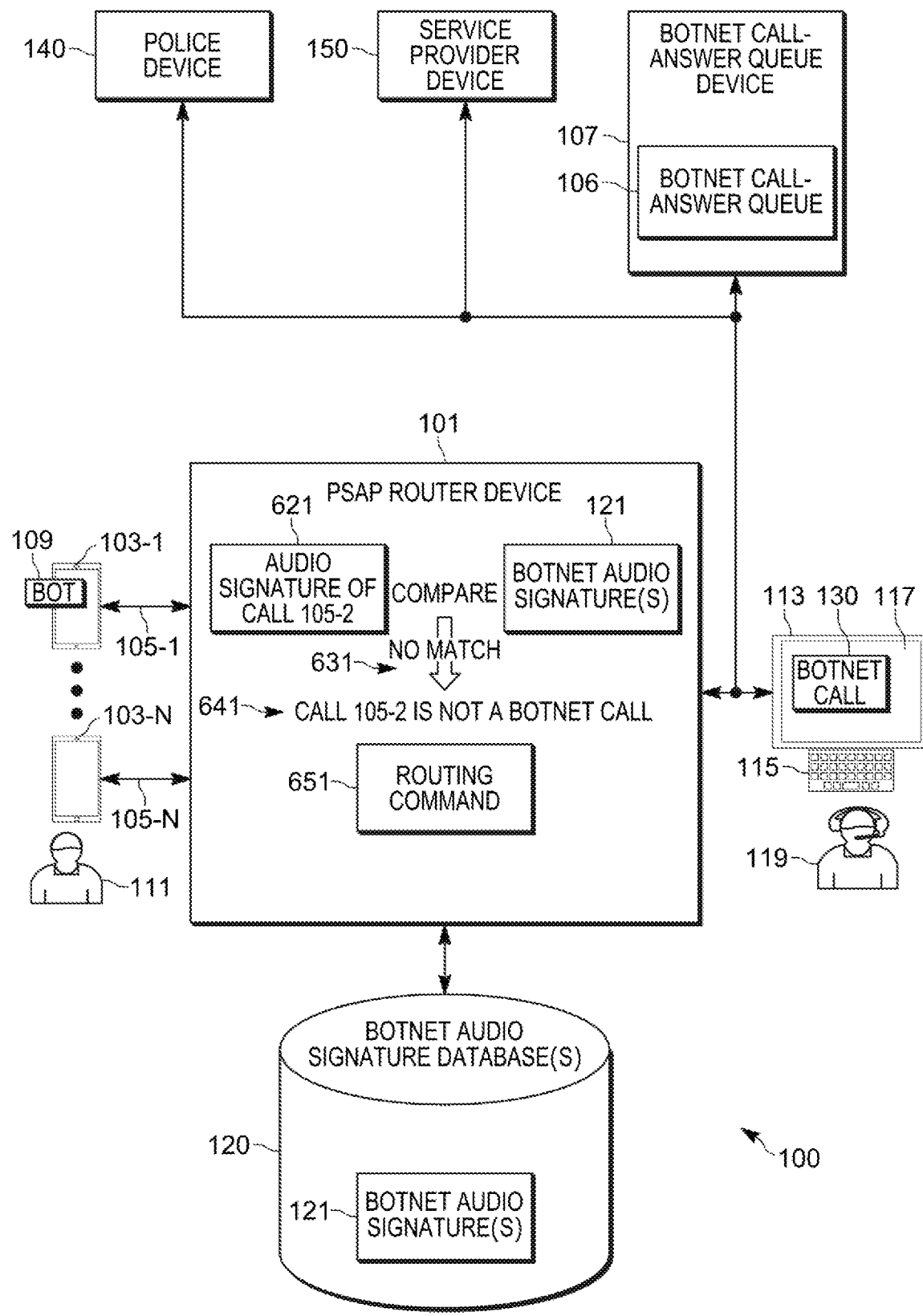
FIG. 6 depicts yet further aspects of the method for routing botnet calls to a botnet call-answer queue implemented in the system of FIG. 1, in accordance with some examples.
Figure 7:
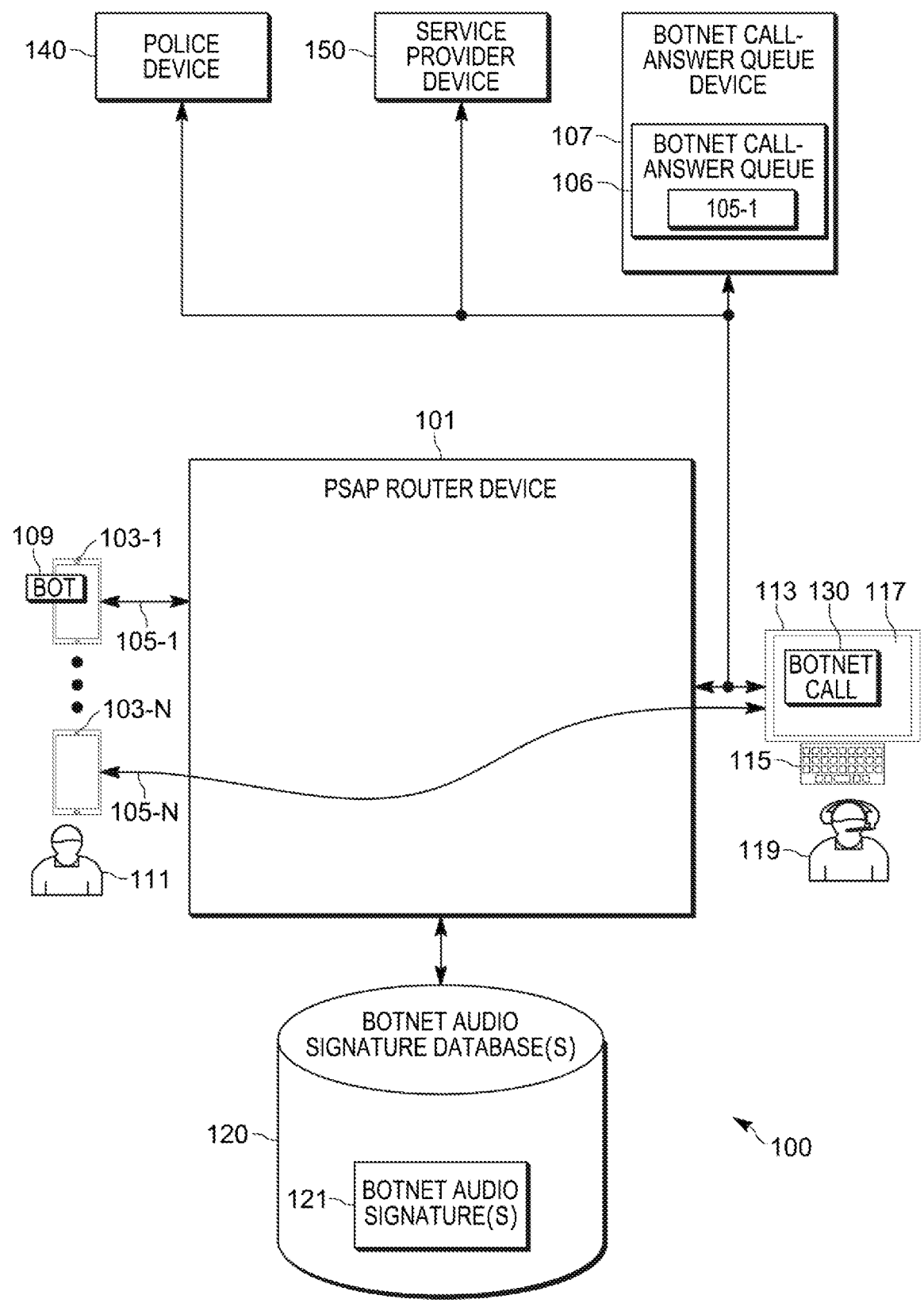
FIG. 7 depicts yet further aspects of the method for routing botnet calls to a botnet call-answer queue implemented in the system of FIG. 1, in accordance with some examples.

Attention is next directed to FIG. 6 and FIG. 7, which depicts the PSAP router device 101 implementing the method 300 but with respect to the call 105-N, which is understood to be not a botnet call. For example, FIG. 6 depicts the PSAP router device 101 determining an audio signature 621 of the call 105-N, comparing the audio signature 621 to the one or more botnet audio signatures 121, and determining that no match 631 has occurred (e.g. a "NO" decision at the block 308). Hence, the PSAP router device 101 determines that the call 105-N is not a botnet call (e.g. as indicated by the data 641) and a routing command 651, which causes the call 105-N to be routed to the PSAP operator device 113. For example, as depicted in FIG. 7, the call 105-N has been routed to the PSAP operator device 113 where the PSAP operator 119 may interact with the caller 111.

While not depicted, in some examples, the bot 109 may be installed at the communication device 103-N and hence the call 105-N may be made by the bot 109. In such examples, once the PSAP operator 119 answers the call 105-N as routed to the PSAP operator device 113, the PSAP operator 119 may determine that the call 105-N is a botnet call (e.g. due to prerecorded audio being played on the call 105-N, and/or the bot 109 not being responsive to questions by the PSAP operator 119 on the call 105, and/or the PSAP operator 119 may have heard the prerecorded audio on previous calls), and actuate the electronic soft button 130 via the input device 115. Such an actuation of the electronic soft button 130 may cause the PSAP operator device 113, and the like, to transit a command to the PSAP router device 101, and/or another suitable component of the PSAP system 100, to cause the call 105-N to be routed to the botnet call-answer queue 106 at the botnet call-answer queue device 107, similar to as shown in FIG. 5 with respect to the call 105-1. In these examples, the audio signature 621 of the call 105-N may be stored at the memory 120 as a botnet audio signature 121 such that audio signatures of future calls that match the audio signature 621 may be determined to be botnet calls.

In some examples, the PSAP router device 101 may determine whether to route a call 105 to the botnet call-answer queue 106 at the botnet call-answer queue device 107, or the PSAP operator device 113, based on call volume and/or whether there are a threshold number of calls 105 (e.g. independent of whether the calls 105 are botnet calls or not). For example, when a number of calls 105 being answered by a plurality of PSAP operators 119 is more than a threshold number of calls (e.g. the plurality of PSAP operators 119 are mostly engaged in answering calls 105 and are hence busy) then the PSAP router device 101 may implement the method 300 to determine whether to route a new call 105 to the botnet call-answer queue 106 at the botnet call-answer queue device 107, or to a "normal" call queue (e.g. for queuing calls that have not been determined to be botnet calls) to wait for an available PSAP operator device 113 to be answered by a PSAP operator 119. Put another way, when no PSAP operators 119 are available to take a call 105, the call 105 is analyzed as described above with respect to the method 300 and, when the call 105 is a botnet call, the call 105 is routed to the botnet call-answer queue 106 at the botnet call-answer queue device 107; otherwise, when the call 105 is determined to not be a botnet call, the call 105 may be routed to a "normal" call queue to wait for an available PSAP operator device 113.

In other examples, when a number of calls 105 being answered by a plurality of PSAP operators 119 is less than a threshold number of calls (e.g. a portion of the plurality of PSAP operators 119 are available to answer calls 105) then the PSAP router device 101 may route a new call 105 to the PSAP operator device 113 to be answered by the PSAP operator 119 (e.g. without initially determining whether the call 105 is a botnet call or not). In these examples, the PSAP router device 101 may concurrently implement the blocks 304, 306, 308, 310 to determine whether the call 105 being answered by a PSAP operator 119 is a botnet call, or not. Put another way, the PSAP router device 101 may be configured to analyze a call 105 while a PSAP operator 119 is engaged on a call 105 at a PSAP operator device 113. When the call 105 is identified as a botnet call at the block 310 (e.g. in response to a "YES" decision at the block 308), the PSAP router device 101 may cause the call 105 to be routed to the botnet call-answer queue 106 at the botnet call-answer queue device 107 (e.g. interrupting the call 105 at the PSAP operator device 113), and provide a notification thereof at a respective display screen 117, and the like. Alternatively, when the call 105 is identified as a botnet call at the block 310 (e.g. in response to a "YES" decision at the block 308), the PSAP router device 101 may provide a notification thereof at a respective display screen 117 and the notification may be provided with the electronic soft button 130, and the like, to provide the PSAP operator 119 with the option of causing the call 105 to be routed to the botnet call-answer queue 106 at the botnet call-answer queue device 107. In general, such examples allow calls 105 to be answered by PSAP operators 119 without any delayed process at the PSAP router device 101, for example when a PSAP operator 119 is available to answer a call 105 (not engaging in another call or botnet call) and/or when a jurisdiction has regulations in place that may require 911 calls to be answered as quickly as possible.

While examples of the method 300 are described with respect to only two communication devices 103, it is understood that tens to hundreds to thousands of botnet calls may be made in DDoS attack and hence, as such botnet calls are received, the PSAP router device 101 causes such botnet calls to be routed to the botnet call-answer queue 106 at the botnet call-answer queue device 107, which may mitigate the DDoS attack. As a botnet call may be held indefinitely at the botnet call-answer queue 106, an instance of the bot 109 that initiated a botnet call is further prevented from making more botnet calls (e.g. as may occur when a botnet call is merely dropped).

As should be apparent from this detailed description above, the operations and functions of computing devices described herein are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
receiving, at a call answering point (CAP) router device, a call;
determining, at the CAP router device, an audio signature of the call;
comparing, at the CAP router device, the audio signature of the call with one or more botnet audio signatures stored a memory;
in response to the audio signature of the call matching at least one of the one or more botnet audio signatures:
identifying, at the CAP router device, the call as a botnet call that has been placed by a botnet;
routing, via the CAP router device, the call to a botnet call-answer queue; and
holding the call in the botnet call-answer queue for an attempted unlimited period of time.

2. The method of claim 1, wherein the audio signature and the one or more botnet audio signatures comprise at least one of: respective identified voice signatures; respective identified audio content; and respective ambient audio signatures.

3. The method of claim 1, further comprising, in response to the audio signature of the call matching at least one of the one or more botnet audio signatures:
transmitting, via the CAP router device, a notification to one or more of: a police device; and a service provider device.

4. The method of claim 1, further comprising, in response to the audio signature of the call matching at least one of the one or more botnet audio signatures:
identifying an originating location of the botnet call.

5. The method of claim 1, further comprising, in response to the audio signature of the call not matching at least one of the one or more botnet audio signatures:
routing, via the CAP router device, the call to a CAP operator device that includes an input device for manually identifying the call as a botnet-initiated call, such that when input is received from the input device, the call is routed to the botnet call-answer queue, the call being held in the botnet call-answer queue for the attempted unlimited period of time, a respective audio signature of the call is generated and stored at the memory as a botnet audio signature.

6. The method of claim 1, further comprising, in response to the audio signature of the call not matching at least one of the one or more botnet audio signatures:
storing the audio signature at the memory;
counting further calls having respective audio signatures that match the audio signature; and
when a number of the further calls reaches a threshold number within a respective given time period: identifying the audio signature as a botnet audio signature;
routing yet further calls having the botnet audio signature to the botnet call-answer queue; and holding the yet further calls in the botnet call-answer queue for the attempted unlimited period of time.

7. The method of claim 1, further comprising, in response to the audio signature of the call not matching at least one of the one or more botnet audio signatures:
determining that the call comprises one or more of a non-service initiated call and an anonymous call; and, in response:
storing the audio signature at the memory;
counting further calls having respective audio signatures that match the audio signature; and
when a number of the further calls reaches a threshold number:
identifying the audio signature as a given botnet audio signature at the memory;
routing yet further calls having the given botnet audio signature to the botnet call-answer queue; and
holding the yet further calls in the botnet call-answer queue for the attempted unlimited period of time.

8. The method of claim 1, wherein the botnet call-answer queue comprises a queue at which the botnet call is held indefinitely.

9. The method of claim 1, wherein the botnet call-answer queue comprises a queue operated by one or more of law enforcement entity and a service provider entity.

10. The method of claim 1, wherein at the botnet call-answer queue, analysis of the botnet call occurs, the analysis including one or more of:
identifying an originating location of the botnet call;
identifying a call identifier of the call; and
identifying a device identifier of an originating communication device.

11. A device comprising:
a communication unit; and
a controller in communication with a memory and the communication unit, the controller configured to:
receive a call;
determine an audio signature of the call;
compare the audio signature of the call with one or more botnet audio signatures stored at the memory;
in response to the audio signature of the call matching at least one of the one or more botnet audio signatures:
identify the call as a botnet call that has been placed by a botnet;
route the call to a botnet call-answer queue; and
hold the call in the botnet call-answer queue for an attempted unlimited period of time.

12. The device of claim 11, wherein the audio signature and the one or more botnet audio signatures comprise at least one of: respective identified voice signatures; respective identified audio content; and respective ambient audio signatures.

13. The device of claim 11, wherein the controller is further configured to, in response to the audio signature of the call matching at least one of the one or more botnet audio signatures:
transmit a notification to one or more of: a police device; and a service provider device.

14. The device of claim 11, wherein the controller is further configured to, in response to the audio signature of the call matching at least one of the one or more botnet audio signatures:
  identify an originating location of the botnet call.

15. The device of claim 11, wherein the controller is further configured to, in response to the audio signature of the call not matching at least one of the one or more botnet audio signatures:
  route the call to a CAP operator device that includes an input device for manually identifying the call as a botnet-initiated call, such that when input is received from the input device, the call is routed to the botnet call-answer queue, and the call is held in the botnet call-answer queue for the attempted unlimited period of time, a respective audio signature of the call is generated and stored at the memory as a botnet audio signature.

16. The device of claim 11, wherein the controller is further configured to, in response to the audio signature of the call not matching at least one of the one or more botnet audio signatures:
  store the audio signature at the memory;
  count further calls having respective audio signatures that match the audio signature; and
  when a number of the further calls reaches a threshold number within a respective given time period: identify the audio signature as a botnet audio signature; route yet further calls having the botnet audio signature to the botnet call-answer queue; and hold the yet further calls in the botnet call-answer queue for the attempted unlimited period of time.

17. The device of claim 11, wherein the controller is further configured to, in response to the audio signature of the call not matching at least one of the one or more botnet audio signatures:
  determine that the call comprises one or more of a non-service initiated call and an anonymous call; and, in response:
  store the audio signature at the memory;
  count further calls having respective audio signatures that match the audio signature; and
  when a number of the further calls reaches a threshold number:
    identify the audio signature as a given botnet audio signature at the memory;
    route yet further calls having the given botnet audio signature to the botnet call-answer queue;
    hold the yet further calls in the botnet call-answer queue for the attempted unlimited period of time.

18. The device of claim 11, wherein the botnet call-answer queue comprises a queue at which the botnet call is held indefinitely.

19. The device of claim 11, wherein the botnet call-answer queue comprises a queue operated by one or more of law enforcement entity and a service provider entity.

20. The device of claim 11, wherein at the botnet call-answer queue, analysis of the botnet call occurs, the analysis including one or more of:
  identifying an originating location of the botnet call;
  identifying a call identifier of the call; and
  identifying a device identifier of an originating communication device.

* * * * *